United States Patent
Oisel et al.

(10) Patent No.: US 8,436,917 B2
(45) Date of Patent: May 7, 2013

(54) METHOD FOR CREATION OF AN ANIMATED SERIES OF PHOTOGRAPHS, AND DEVICE TO IMPLEMENT THE METHOD

(75) Inventors: Lionel Oisel, La Nouaye (FR); Louis Chevallier, La Meziere (FR); Philippe Schmouker, Betton (FR); Valerie Allie, Saint-Armel (FR)

(73) Assignee: Thomson Licensing, Issy les Moulineaux (FR)

( * ) Notice: Subject to any disclaimer, the term of this patent is extended or adjusted under 35 U.S.C. 154(b) by 448 days.

(21) Appl. No.: 12/660,847

(22) Filed: Mar. 5, 2010

(65) Prior Publication Data

US 2010/0225786 A1    Sep. 9, 2010

(30) Foreign Application Priority Data

Mar. 5, 2009  (FR) ..................... 09 51386

(51) Int. Cl.
*H04N 5/262*  (2006.01)
(52) U.S. Cl.
USPC ......................................................... 348/239
(58) Field of Classification Search .................. 348/239, 348/222.1, 578, 571; 345/473–474
See application file for complete search history.

(56) References Cited

U.S. PATENT DOCUMENTS

| | | | |
|---|---|---|---|
| 6,289,140 B1 * | 9/2001 | Oliver | 382/313 |
| 7,027,086 B1 * | 4/2006 | Ozawa et al. | 348/220.1 |
| 7,450,162 B2 * | 11/2008 | Shioji et al. | 348/231.2 |
| 2002/0161582 A1 * | 10/2002 | Basson et al. | 704/260 |
| 2005/0168579 A1 | 8/2005 | Imamura | |
| 2005/0231513 A1 * | 10/2005 | LeBarton et al. | 345/473 |
| 2006/0007327 A1 * | 1/2006 | Nakamura et al. | 348/239 |
| 2008/0001950 A1 * | 1/2008 | Lin et al. | 345/473 |
| 2008/0018748 A1 * | 1/2008 | Niemi et al. | 348/218.1 |
| 2008/0239084 A1 | 10/2008 | Endo | |
| 2008/0297518 A1 * | 12/2008 | Sayre et al. | 345/474 |
| 2009/0231458 A1 * | 9/2009 | Moriyama | 348/222.1 |

FOREIGN PATENT DOCUMENTS

| | | |
|---|---|---|
| JP | 11355640 A | 12/1999 |
| JP | 2000184367 A | 6/2000 |
| JP | 2001215604 A | 8/2001 |

OTHER PUBLICATIONS

French Search Report dated Jul. 27, 2009.

* cited by examiner

*Primary Examiner* — Aung S Moe
(74) *Attorney, Agent, or Firm* — Tutunjian & Bitetto, P.C.

(57) ABSTRACT

The present invention relates to a method for creation of an animated series of photographs. A photograph acquisition device analyzes the images in order to detect an absence of movement. The detection of an absence of movement during a determined period triggers a photograph to be taken and the memorization of image data in the series of photographs. The user introduces a command to end the acquisition of the series of photographs. The data of different photographs taken are assembled to form an animated series. During the reproduction, the series is reproduced by displaying successively each photograph, the time between each photograph reproduction can possibly be introduced by the user. The invention also relates to a photograph acquisition device designed acquire said animated series of photographs.

18 Claims, 3 Drawing Sheets

METHOD FOR CREATION OF AN ANIMATED SERIES OF PHOTOGRAPHS, AND DEVICE TO IMPLEMENT THE METHOD

This application claims the benefit, under 35 U.S.C. §119 of French Patent Application 0951386, filed Mar. 5, 2009.

FIELD OF THE INVENTION

The invention relates to a method for creating a sequence of photographs from still images taken at a determined time, and a device for the implementation of the method.

BACKGROUND

In a digital camera, the image in front of the objective is projected onto a CCD or CMOS sensor. The image is then converted into digital data and stored in a memory. The memory can be definitively incorporated in the device or it can be removable, it is then presented in the form of a plug-in support. By means of digital technology, the user takes a photograph and is able to see it immediately afterwards on a small screen usually situated on the rear face of the device, typically the screen incorporates LCD or OLED technology. Using the screen, the user can verify the quality of the photograph that has just been taken, decide to keep it in the memory or to delete it, and can display old photographs for which the data are recorded in the memory. In some devices, the CCD or CMOS sensor is sufficiently rapid to carry out the acquisition of a video sequence of short duration. These devices also have a microphone to capture the sound environment during the recording of the video sequence. During the reproduction of the video sequence, a loud speaker located inside the device enables reproduction of the sound recorded at the same time as the images.

Computer programs enable photographs taken consecutively to be connected in such a manner as to create a visual animation. If the sequence is constituted of a high number of photographs and if there is little difference between two consecutive photographs, the reproduction of the sequence gives an impression of movement. For example, a user has an articulated doll that he photographs. Between two photographs, he moves the limbs and head of the doll slightly thus showing that the doll moves. For each take, he slightly advances the scenery that serves as background to the photograph. During automatic reproduction of the picture series, the sequence gives the impression that the doll is walking in front of the scenery. If the reproduction is carried out using at least ten images per second, the spectator has an impression of fluidity in the movement. Any object can be used to create an animated sequence: an animal, a toy, a toy construction set (thus it is possible to create a sequence showing the construction of a house). It is also possible to photograph oneself while dancing, the animated sequence produced presents an effect identical to that of the "Kinetoscope", a device invented around 1891 by Dickson. This device presented a series of fixed images, each image appearing for a short instant, retinal persistence gives an impression of movement.

To create an animated sequence while filming objects that do not move naturally, it is necessary to take numerous photographs of said objects with a camera fixed on a support. On some cameras, the triggering of the taking of photographs can be effected by pressing on the button of an infrared remote control. This triggering requires a movement on the part of the operator, and thus requires that he release at least one hand from the object that he is animating. As a result the operation becomes fastidious and comprises a risk that the object falls, which would oblige the operator to restart from the beginning of the series of photographs.

The document JP 2000 184367 filed by OLYMPUS describes a camera. This document describes a system enabling still pictures of high quality to be obtained while filming animated video contents. A film camera films a scene and, at a particular moment, triggers the acquisition of an image by a digital still picture camera. Certain movements of objects in the field of the camera trigger a photograph to be taken.

There is therefore a real requirement for a solution enabling the triggering of the taking of photographs to be automated while avoiding that the operator is obliged to perform any physical gesture to provoke this triggering.

SUMMARY OF THE INVENTION

The purpose of the invention is a method for creating a series of photographs, comprising a plurality of steps of acquisition and memorization of photographs by a device. The method comprises notably a step of image analysis in order to detect the absence of movement in the images acquired over a determined period, the detection of an absence of movement during the determined period triggering the acquisition of a photograph and the memorization of data of the image acquired by concatenating it with the data of images previously acquired, the manual introduction of a command terminating the input of the series of photographs.

In this way, the photographs taken are associated with one another according to a clearly defined order, each photograph being taken following the detection of an absence of movement in front of the camera objective. These photographs are displayed during the reproduction of the animated sequence at regular time intervals. In this way, the user perceives an animation centered on the object in movement with a high level of realism.

According to a first improvement, the method comprises a step of introduction of the determined period by the user. In this way, the user can set the time during which he must maintain the objects of the image immobile in order to trigger the taking of a new photograph.

According to another improvement, the method comprises a step of acquisition of a sound triggering the acquisition of a photograph before the end of the determined time. In this way, the user who maintains the objects of the image immobile, can shorten the programmed period and thus take the new photograph more rapidly. According to a variant, the method comprises a step of acquisition of a sound triggering the deletion of image data of the last photograph acquired in the photograph series. In this way, the deletion is commanded without the user making a gesture that could displace the objects.

According to an improvement, the method comprises a step of introduction of another period taken into account during the reproduction of the series of photographs to determine the time interval between the reproductions of two images, the period introduced being incorporated into the data constituting the series of photographs. In this way, the images of the series can be reproduced according to a timing that can be set by the photograph series creator.

According to an improvement, the acquisition of each photograph is carried out following a step of movement detection followed by a step of absence of movement detection during the determined period. In this way, the spurious taking of photographs due to a sustained period of immobility of objects in front of the camera objective can be avoided and thus a smaller quantity of image data is used.

According to an improvement, the method comprises a step of transmission of a first signal that can be perceived by the user upon the detection of an absence of movement during the determined period. In this way, the user is informed of the taking of each photograph and applies a movement to the objects to take a new image. If the image that has just been shot does not suit, the user can possibly delete it from the series. According to a variant, the method comprises a step of transmission of a first signal that can be perceived by the user upon the detection of an absence of movement and that stops at the end of the determined period. In this way, the user can be informed that the device detects an absence of movement and that the taking of the next photograph is imminent. He can perform a movement to delay this taking of a photograph.

The object of the invention is also a device for the creation of a photograph series, comprising a memorization means for a plurality of images acquired using an image acquisition means. The device comprises notably a means of image analysis in order to detect the absence of movement in the images captured over a determined period, the detection of an absence of movement during the determined period triggering the acquisition of a photograph and the memorization of data of the image acquired by concatenating it with the data of images previously acquired, a means of introduction of a command terminating the input of the series of photographs.

BRIEF DESCRIPTION OF THE DRAWINGS

Other characteristics and advantages of the invention will now emerge with more details, within the scope of the description that follows, with the aid of embodiments given as an example by referring to the figures attached wherein.

DETAILED DESCRIPTION

Figure 1A:
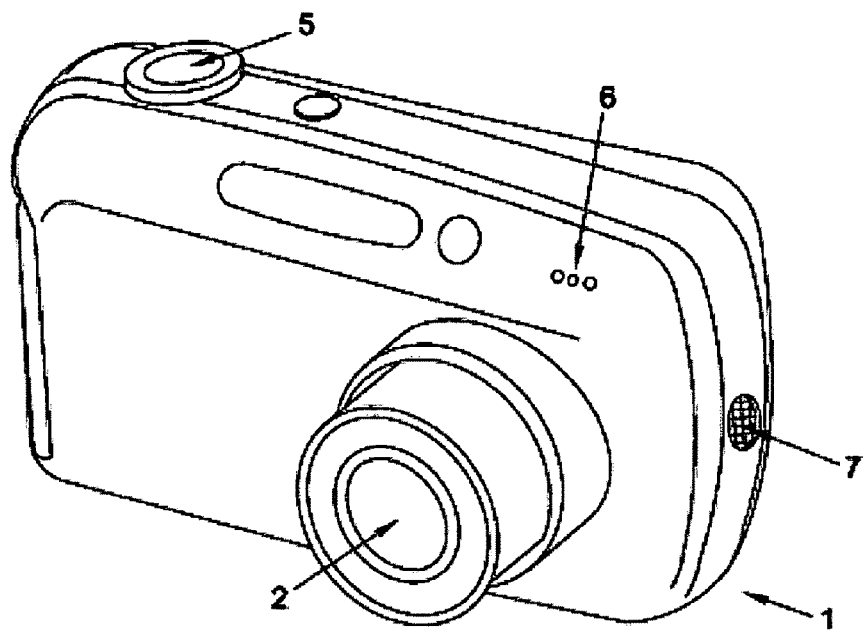
FIGS. 1.a and 1.b represent a front view and a rear view of a camera for the implementation of an embodiment of the invention.
Figure 1B:
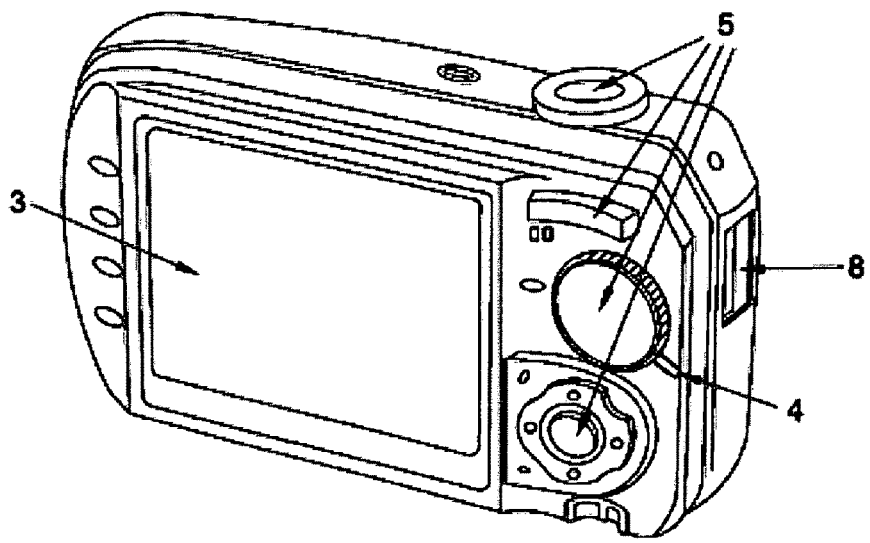

According to a preferred non-restrictive embodiment, the invention is implemented by a digital camera, as presented in the FIGS. 1.a and 1.b. Externally, the digital camera 1 comprises an objective 2, a screen 3 of LCD or OLED technology, a memory module possibly removable 4 and buttons 5 for parameter setting, shooting and navigation in the menus displayed on the screen 3 and a validation key "OK". The buttons enable the camera 1 to be set either to "shoot" mode where the screen 3 displays the image detected by the CCD sensor, or to reproduction mode of memorized contents where the images recorded in the storage module 4 are displayed on the screen 3. According to some models, the commands are accessible via icons displayed on the screen 3. An icon is highlighted and the associated function is executed by pressing the key "OK. The camera 1 has numerous shooting modes including that enabling an "Animated Sequence of Photographs" (ASP) to be recorded. The camera 1 can also acquire or record the sound environment using a microphone 6 located on the front face of the camera. It also has a small loudspeaker 7 located on the side. When the user switches his camera to audiovisual content reproduction mode, the visual data appear on the screen and the associated sound sequence is reproduced using the loudspeaker 7.

Optionally the camera 1 comprises a connector 8 that enables transmission of visual and sound contents to a computer. For example, the communication is implemented via a USB type link. The photos are recorded in files that are transferred to the computer. The user can thus see his photos on a big screen and listen to the sound contents via loudspeakers connected to the computer.

After having detailed the main components of an example of the device for the implementation of the invention, it will be explained how these components cooperate.

Figure 2:
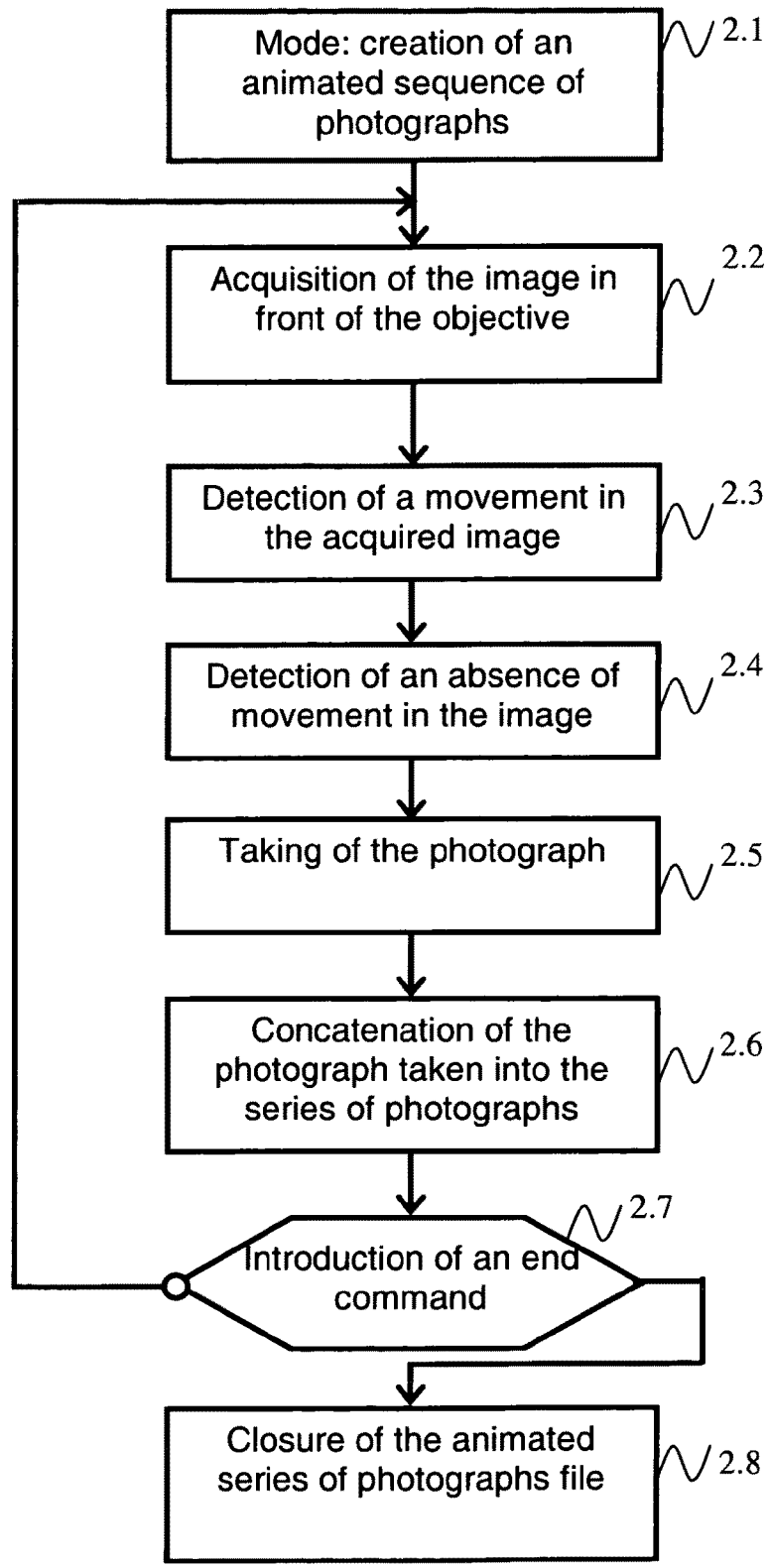
FIG. 2 shows a flowchart of operations that will enable the production of an animated series of photographs.

The flow chart of FIG. 2 describes the progression of the main steps for the implementation of the method according to an embodiment of the invention. The user first positions his camera 1 in a fixed position, his objective directed towards the object that he intends to film. At step 2.1, the user sets the parameters of his camera in the ASP mode, by using the keys 5 or possibly a menu and an icon for selection. The camera 1 then commences the acquisition of images in front of the objective (step 2.2). The images are numbered and analyzed by a module that can be executed from the camera. Initially, the module detects a movement in the image (step 2.3). The movement detection is carried out in any area of the image captured by the camera objective. The movement can also come from modification of the lighting. In this way, while the user modifies the light without moving the objects, a movement is detected. For example, an ASP can be created representing the rising then setting of the sun on immobile objects such as a house, trees, and an enclosure.

Next in step 2.4, the module detects an absence of movement in the image captured by the photographic objective. The absence of movement is detected over a determined period. Advantageously, the user can set this parameter using a menu that can be access from the option "ASP mode". By default, the period is set at two seconds, if the user is faster in positioning the object in front of the objective, he can reduce this period. In step 2.5, the taking of the photograph is triggered when an absence of movement in the image is detected. Advantageously, a signal that can be perceived by the user is transmitted to inform the user that the photograph has been taken, and that he must move the object. If the user decides that the photograph should not have been taken, he can press a button to delete the data of the last photograph. This signal can be a sound signal and can be emitted by the loudspeaker 7, or it can be a light signal using an LED located on the front face of the camera. According to an embodiment variant, the camera emits a signal that can be perceived by the creator of the ASP as soon as the image in front of the optical sensor is fixed. The signal changes over time and stops when the period programmed by the user has passed. The change in the signal usually consists in a reduction of the tempo of its emission. In this way, the user can control the immobility of the object in front of the optical sensor and know that the photograph is taken at the end of the emission of this changing signal.

The digital data of the photograph taken is concatenated with the data of previous photographs (step 2.6), advantageously in chronological order. At step 2.7, the executable module checks if the user has introduced a command for terminating the acquisition of an ASP. If no command has been introduced, the program loops at step 2.2 of the image processing. If a command is introduced, the ASP sequence is terminated and the set of photographs acquired is assembled in a file (step 2.8). This file is identified by the device in such a way as to be easily selected to be reproduced. Advantageously, the data constituting the ASP are recorded in a file comprising an index table that enables each group of data constituting each photograph taken to be selected individually.

Figures 3, 4:
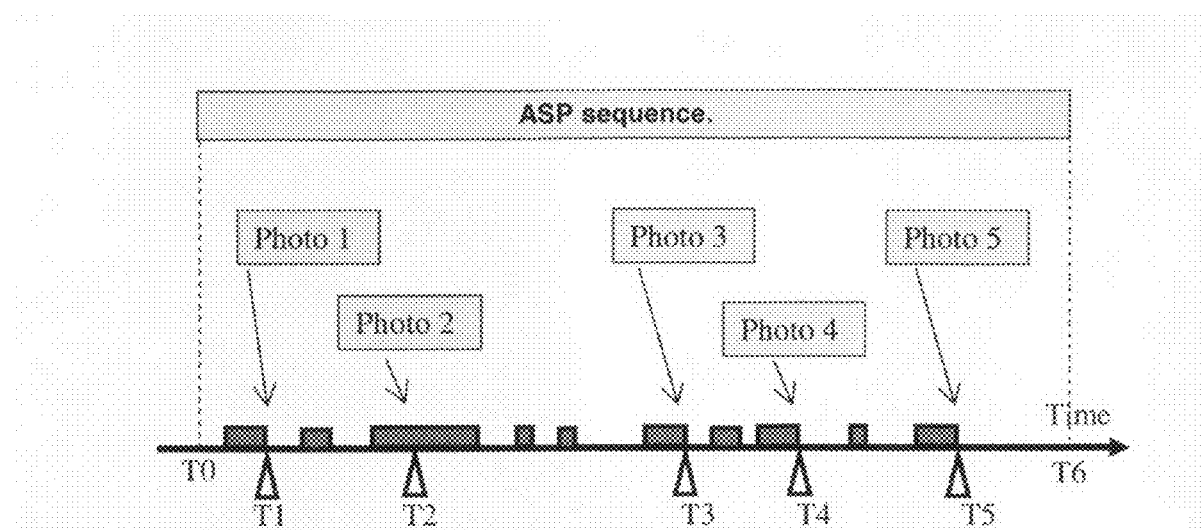
FIG. 3 shows a timing diagram of photograph takes for the acquisition of the animated sequence of photographs.
FIG. 4 shows an example of the index table for the management of the structure of an animated series of photographs.

FIG. 3 shows a timing diagram of photograph takes enabling an ASP sequence to be produced. At time T0, the user configures his camera to launch the acquisition of such a sequence. The grey areas represent the moments where no movement is detected. A time T1, as no movement has been detected during the programmed period, at the end of this timeout the photograph 1 is taken. As long as the absence of movement is detected during a period less than that programmed by the user, not photograph taking is carried out. If the object remains immobile after the photograph is taken, as is the case for photograph 2, no photograph is taken as long as the device does not detect any movement beforehand. In this way, the camera does not take two identical photographs and so the ASP sequence does not contain the same group of data twice. In the example illustrated by FIG. 3, the user takes four other photographs at the times T2, T3, T4 and T5. At time T6, the user presses a button on the camera ending the acquisition of the ASP sequence.

FIG. 4 shows an example of the structure of an index table of an ASP file. The table comprises a header containing the file type, the date and the time of the first photograph take (provided by a clock implemented in the camera) and the number of photographs of which the ASP is constituted. Then, each photograph is identified by the date and time it was taken, or by an index number and is associated with a pointer enabling the data of the associated image to be found. The date and time are a means to identify a file and images, it is clear that any other means is appropriate, including that of introducing manually a string of characters.

Advantageously, following the introduction of an end command, the camera 1 proposes to determine the time between the photographs during the reproduction of the sequence. One embodiment consists in the display of a message on the screen 3 indicating a default value, the user can then increase or decrease this value by pressing the navigation keys. For example the user introduces the value of 200 milliseconds, in this way five photographs will be displayed per second during the reproduction. This parameter is important if the ASP sequence produced by the device is of analogue type, according to a video format compatible with that of a film, or a video cassette, such a sequence possessing intrinsically its own timing. This parameter is memorized in the header of the index table of the ASP file.

An ASP file can be reproduced by a device equipped with a display unit. Advantageously, the camera 1 has a mode of reproduction of contents recorded in the memory. The user calls the menu describing the different contents memorized in the device, the list displayed indicates the type for each file: photo, video, sound video, ASP, etc. The user can thus select an ASP file and by pressing the key "OK" he can launch the reproduction. Any other device such as a computer or a decoder equipped with a hard disk can also perform the reproduction of an ASP. The image succeeds one another on a screen according to whatever timing that the creator of the ASP introduced.

According to an improvement, the intermediary images are generated by interpolation during the reproduction. This improvement is particularly useful when the ASP sequence is a video document. The generation of interpolated intermediary images can be carried out using object segmentation and area filling techniques as described in the following articles:

"Robust Object Segmentation Using graph Cut with Object and Background Seed Estimation" J. H. Ahn, K Kim, H Bruyn-ICPR IEEE 2006

"Efficient Video Object Segmentation by Graph-Cut" Jinjun Wang; Wei Xu; Shenghuo Zhu; Yihong Gong, Multimedia and Expo, 2007 IEEE International Conference.

The techniques described in the articles above enable the objects in movement in the sequence to be detected and cut-out and generation of new images presenting these objects in different places on the same background.

According to another improvement, the user can shorten the period by emitting a sound. When the user has rapidly positioned the object that he wants to photograph, there is no reason to wait for the end of the timeout period. The user can trigger the taking of a photograph by whistling, or clicking his tongue or fingers, before the end of the determined period. The sound emitted by the creator of the ASP is perceived by the microphone 6. According to an improvement, it is advantageous that the camera emits a sound signal to inform the user that the photograph has been taken. It has been previously stated that a key 5 on the rear face of the camera 1 enables this last photograph to be deleted. According to a variant of the aforementioned improvement, the sound emitted by the user triggers the deletion of the last photograph. In this way, the deletion is commanded without the user making a gesture that could displace the objects.

While the present invention was described in reference to particular illustrated embodiments, said invention is in no way limited to these embodiments, but only by the appended claims. It will be noted that any image acquisition device, for example a computer connected to a camera, is capable of acquiring an animated series of photographs.

The invention claimed is:

1. Method for creation of a series of photographs comprising:
    a plurality of photograph acquisition and memorization steps by a device, said steps including a step of image analysis in order to detect an absence of movement in images captured, wherein a detection of the absence of movement initiates a predetermined time period and wherein a detection of the absence of movement throughout the predetermined time period triggers an acquisition of a photograph at the end of the predetermined time period and a memorization of image data acquired in the photograph by concatenating the image data with image data previously acquired, the manual introduction of a command terminating an input of the series of photographs.

2. Method for creation of a series of photographs according to claim 1, further comprising a step of acquisition of a sound triggering an acquisition of an additional photograph before an end of the predetermined time period for the additional photograph.

3. Method for creation of a series of photographs according to claim 1, further comprising a step of acquisition of a sound triggering the deletion from the image data of the last photograph acquired in the series of photographs.

4. Method for creation of a series of photographs according to claim 1, further comprising a step of introduction of an other period that is taken into account during a reproduction of the series of photographs to determine a time interval between the reproductions of two images, the period introduced being incorporated into data constituting the series of photographs.

5. Method for creation of a series of photographs according to claim 1, wherein the acquisition of each photograph is carried out following a step of detection of movement followed by a step of detection of absence of movement.

6. Method for creation of a series of photographs according to claim 1, further comprising a step of transmission of a first signal that can be perceived by a user upon the detection of the absence of movement.

7. Method for creation of a series of photographs according to claim 1 further comprising a step of transmission of a signal that can be perceived by a user upon the detection of the absence of movement, said signal ending at the end of the predetermined time period.

8. Method for creation of a series of photographs according to claim 1, wherein the acquisition of a photograph at the end of the predetermined time period is performed in response to detecting that a movement in the images has occurred prior to the predetermined time period.

9. Method for creation of a series of photographs according to claim 1, wherein said predetermined time period is selected by a user.

10. Device for the creation a series of photographs comprising:
    a means for memorizing a plurality of photographs acquired using a means for acquiring images, wherein said means for memorizing the plurality of the photographs comprises a means for analyzing the images in order to detect an absence of movement in the images, wherein a detection of the absence of movement initiates a predetermined time period and wherein a detection of the absence of movement throughout the predetermined time period triggers an acquisition of one of said photographs at the end of the predetermined time period and a memorization of image data acquired in the one of said photographs by concatenating the image data with image data previously acquired, and a means for introducing a command terminating an input of the series of photographs.

11. Device for the creation of a series of photographs according to claim 10, further comprising a means for acquisition of a sound triggering an acquisition of an additional photograph before an end of the predetermined time period for the additional photograph.

12. Device for the creation of a series of photographs according to claim 10, further comprising a means for acquisition of a sound triggering the deletion from the image data of the last photograph acquired in the series of photographs.

13. Device for the creation of a series of photographs according to claim 10, further comprising a means for introduction of an other period that is taken into account during a reproduction of the series of photographs to determine a time interval between the reproduction of two images, the period introduced being incorporated into the data constituting the series of photographs.

14. Device for the creation of a series of photographs according to claim 10, wherein the acquisition of each photograph is triggered by the image analysis means when a movement followed by an absence of movement is detected.

15. Device for the creation of a series of photographs according to claim 10, wherein the means for memorizing the plurality of photographs is configured to perform a step of transmission of a first signal that can be perceived by a user triggered by the image analysis means upon the detection of the absence of movement.

16. Device for the creation of a series of photographs according to claim 10 further comprising a means for transmission of a signal that can be perceived by a user triggered by the image analysis means upon the detection of the absence of movement said signal ending at the end of the predetermined time period.

17. Device for the creation of a series of photographs according to claim 10, wherein the acquisition of one of said photographs at the end of the predetermined time period is performed in response to detecting that a movement in the images has occurred prior to the predetermined time period.

18. Device for the creation of a series of photographs according to claim 10, wherein said predetermined time period is selected by a user.

\* \* \* \* \*